Jan. 26, 1926.                                                                    1,571,068
C. W. STANCLIFFE
HEAT INTERCHANGER
Filed August 7, 1922                                    4 Sheets-Sheet 1

INVENTOR
C. W. Stancliffe
by Hughes Brown Quinby May
attys

Jan. 26, 1926. 1,571,068
C. W. STANCLIFFE
HEAT INTERCHANGER
Filed August 7, 1922 4 Sheets-Sheet 2
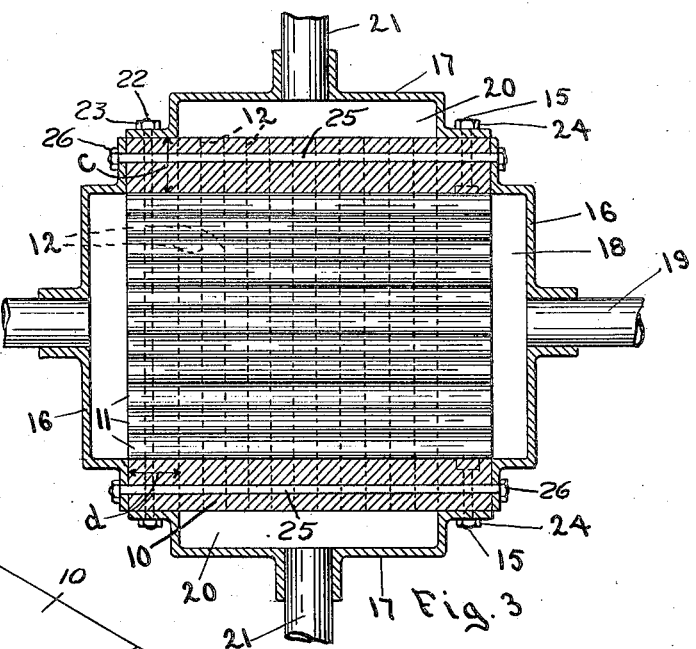
Fig. 3.
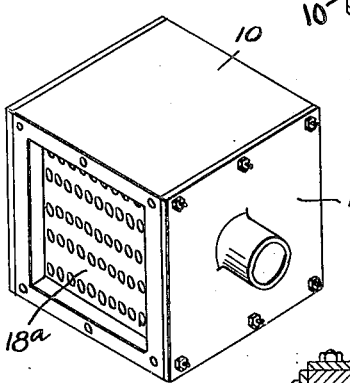
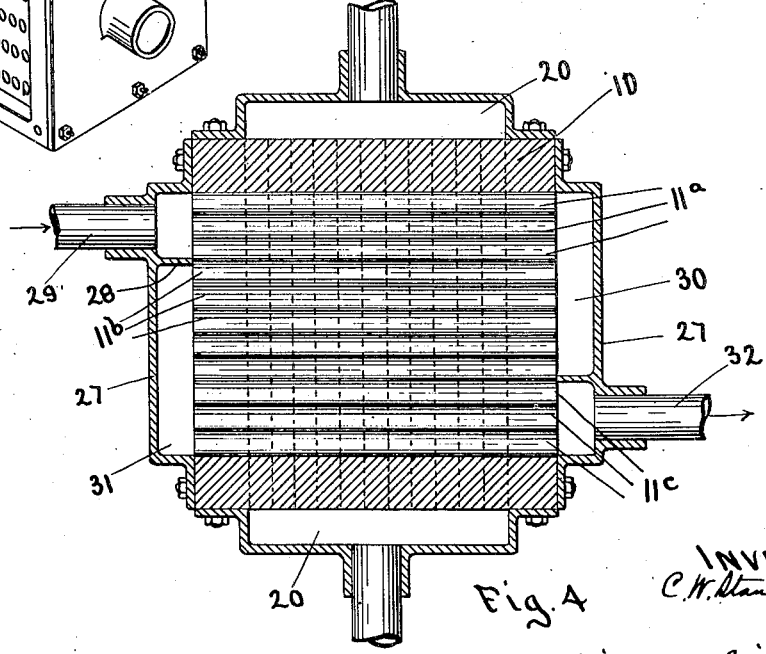
Fig. 4
INVENTOR
C. W. Stancliffe
by [signature]
att'ys Jan. 26, 1926. 1,571,068
C. W. STANCLIFFE
HEAT INTERCHANGER
Filed August 7, 1922 4 Sheets-Sheet 3
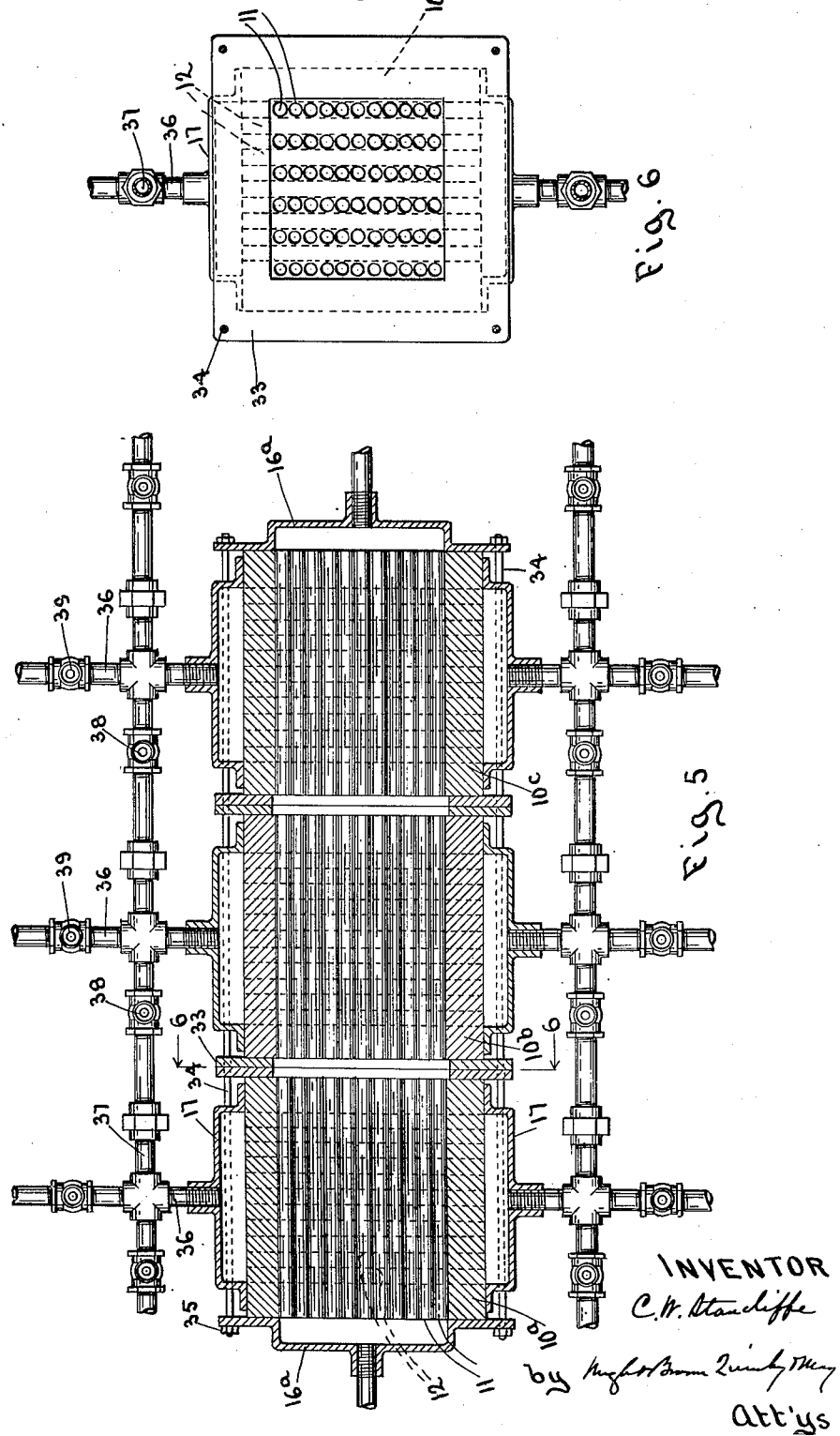

Jan. 26, 1926.  1,571,068
C. W. STANCLIFFE
HEAT INTERCHANGER
Filed August 7, 1922   4 Sheets-Sheet 4

INVENTOR
C. W. Stancliffe
by Wright Brown Quinby May
att'ys

Patented Jan. 26, 1926.

1,571,068

UNITED STATES PATENT OFFICE.

CECIL W. STANCLIFFE, OF NEW YORK, N. Y., ASSIGNOR TO STANCLIFFE ENGINEERING CORPORATION, OF NEW YORK, N. Y., A CORPORATION OF NEW YORK.

HEAT INTERCHANGER.

Application filed August 7, 1922. Serial No. 580,073.

*To all whom it may concern:*

Be it known that I, CECIL W. STANCLIFFE, a subject of the King of Great Britain, residing at New York, in the county of New York and State of New York, have invented new and useful Improvements in Heat Interchangers, of which the following is a specification.

The present invention relates to means for effecting exchange of heat between fluids of different temperatures; as for the purpose of condensing steam or other vapors by the cooling effect of water or air or other relatively cold fluid, for heating oil by steam, air by hot gases, and for an infinity of other analogous uses where in some cases the aim may be to heat a given fluid and in other cases to cool a fluid, or obtain secondary effects due to heating or cooling, and in still others to obtain both the effect of cooling one fluid and heating another.

My object in producing this invention has been to provide a heat interchanger which is much more compact than those heretofore used having equal areas of heating and cooling surface, which is more efficient in effecting heat transfer, and which is economical both in first cost of manufacture and in cost of maintenance. A further object has been to embody the above named characteristics in a heat transfer unit which may be manufactured and handled as a unit structure or article, and combined as such with fittings for conducting fluid to and away from its interior passages, and with other units in a great variety of combinations.

The invention consists, first, in a heat interchanger which is essentially a solid block having numerous passageways extending through it in different directions, and second, in the combination of such unit with accessory fittings, or with both other units and such fittings, in various desired arrangements according to the special purposes in view for heating or cooling of fluids by means of heat interchanged with other fluids. Such unit in two of its possible embodiments, and in illustrative combinations of the same, as above indicated, are shown in the drawings herewith furnished and are described in detail in the following specification.

In the drawings,—

Figure 3 is a sectional view on a plane at right angles to that shown in Figure 2, illustrating the same combination with other accessory fittings, the plane of section being indicated by line 3—3 of Figure 1.

Figure 4 is a sectional view similar to Figure 3, but showing a modification designed to effect flow of one of the fluids in a sinuous course with a number of passes through the unit.

Figure 5 is a sectional view illustrating in a diagrammatic manner how a number of units may be combined with one another and with accessory fittings for any desired purpose.

Figure 6 is a cross section on line 6—6 of Figure 5.

Figure 9 is a perspective view showing a modified construction of heating unit.

Like reference characters designate the same parts wherever they occur in all the figures.

Figure 1:
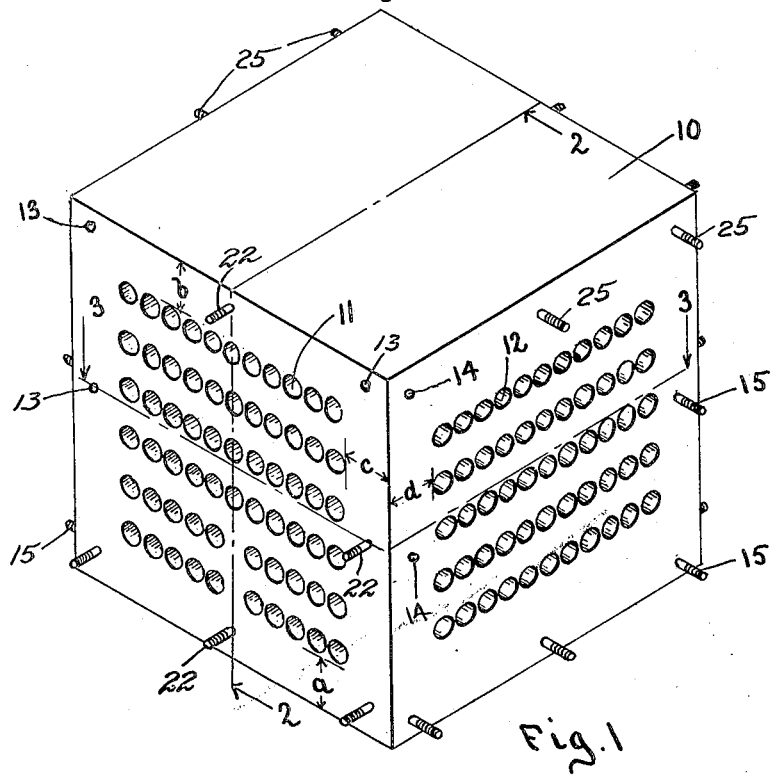
Figure 1 is a perspective view of one of the heat transfer units by itself.

Describing first the heat interchanger unit, this is essentially a solid block 10 having passages 11 extending parallel to one another and in parallel courses through the block in one of its dimensions, and another series of passages 12 parallel to one another and in courses intermediate those of the passages 11, extending through the block in one of its other dimensions. Most conveniently the block is made in rectangular form, its adjacent faces being at right angles to each other. It may be a cube, or have any two of its dimensions equal to each other and different from the third dimension, or all three dimensions may be different from each other. However, it is not essential that the unit be rectangular, for it may be made as a prism of any desired cross section, or, indeed, of any other form desired which permits of passages being provided in it, as above indicated and as more fully hereinafter described.

Preferably the passages are provided by tubes laid in alternate courses, with those of each course crossing those of the adjacent courses, and the spaces between the tubes being filled with metal which is flowed around the tubes while in the molten state and allowed to solidify. The best practical method of doing this is to lay the tubes, after their ends have been plugged or otherwise closed or sealed to exclude the molten metal, in the desired arrangement in an empty mold, and then to fill the mold with the molten metal. To get the best results, the mold should be heated to a temperature approximating, and preferably somewhat above, that of the molten metal before pouring the metal, and should be maintained at that temperature during the pouring and for a long enough time afterward to enable the metal to find an entrance into the interstices and crevices between and around the tubes, and to allow air entrapped in such crevices, and any solid impurities which may be contained in the meal, to rise to the top or settle to the bottom. After the embedding metal has become solid, the composite block is removed from the mold and the ends of the tubes are opened.

The tubes used for this purpose may be round, square, oblong, elliptical or have other transverse outline, according to the purpose for which a particular unit may be required; and the walls of such tubes may be straight lengthwise or corrugated or of spiral formation, as desired for the purpose in view. In cases where the tubes are of prismatic section, and particularly when they are square or oblong, spaces should be left between adjacent tubes of each course wide enough to permit flow of the molten metal in the process of casting. In case tubes of curvilinear cross section, which make only point or line contact with one another, are used, it is not necessary to leave open spaces between adjacent tubes, since their curvatures give sufficient room for flow around them of the embedding metal.

Instead of making the passages by embedding tubes in molten metal as thus described, they may be formed by cores which are removed after the molten metal has solidified. In any case the resultant structure is a solid block having two or more series of passages crossing one another.

The metal used for the body of the unit as thus described may be any metal which has a lower melting point than the tubes or cores which are embedded in it to provide the passages. Indeed, I do not restrict the protection which I claim to metal as the substance for this purpose, since I may use any liquefiable or plastic material which is capable of being cast or molded and has sufficient heat conductive capacity for the purposes in view in any case, and is not injuriously affected by the temperatures to which it is exposed in use, besides having sufficient cohesive strength to withstand the mechanical stresses to which it may be subjected.

Preferably the tubes or passages in the unit are so spaced and arranged in the embedding material that a substantial body of such material is left at each of the corners of the unit and at the ends or sides which have bounding surfaces parallel to the courses of passages. In other words, between the lowermost course of passages and the adjacent face of the block is a layer of solid metal indicated by the dimension $a$ in Figure 1; and between the uppermost course of tubes and the top surface of the unit is a layer of substantial thickness indicated by the dimension $b$. And the width of each course of tubes or passages is less than the dimension of the block in the same direction, which leaves solid corners of the dimensions $c$ and $d$. Within the masses of solid material thus provided are formed holes 13 and 14 which extend throughout the different transverse dimensions of the block and are adapted to receive fastening rods. These holes may be formed by cores in the course of manufacture of the unit or they may be subsequently drilled. Instead, however, of leaving holes for subsequent insertion of fastening means, studs or bolts 15 may be embedded and left with projecting ends for the same purpose.

Figure 2:
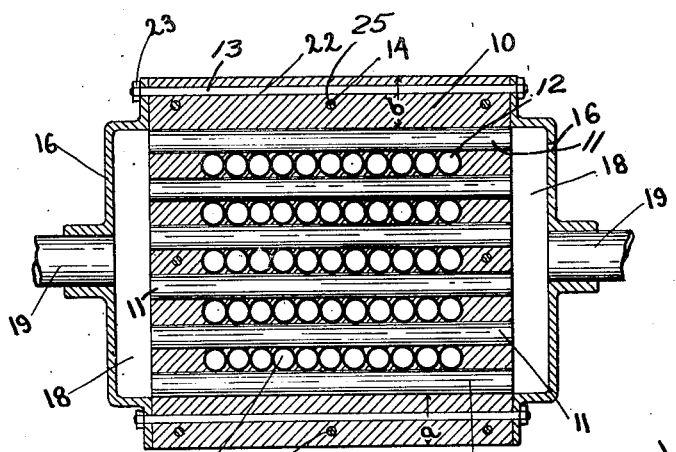
Figure 2 is a sectional view showing such unit combined with accessory fittings, the plane of section being indicated by the broken line 2—2 of Figure 1.

Such a unit is put to the uses of a condenser or heater by applying to those faces in which the passages open, cover fittings 16, 16 and 17, 17, as shown in Figures 2 and 3. The fittings 16, 16 overlie the faces through which the passages 11 open and have interior chambers 18 making communication with the several passages. Pipes 19, 19 are secured in these cover fittings to conduct the fluid which is intended to pass through these passages. Similarly the cover fittings 17, 17 overlie the ends of the passages 12 and have interior chambers 20 into which open conducting tubes 21. The latter figures also show the use of tie-rods 22 passing through the holes 13 to hold the cover fittings 16 in place with the aid of nuts 23. They also show the use of the embedded bolts 15 and nuts 24 screwed upon them, as well as of rods 25 passing through the holes 14 and nuts 26, to secure the cover fittings 17 in place.

It is possible also, and is within the scope of my protection, to recess the faces of the unit through which the passages open, as is shown in Figure 9, whereby chambers 18ª, similar to the chambers 18 and 20, are formed within the limits of the unit itself, and in that case flat cover fittings 16ª may be used instead of the dished form shown; or if dished or recessed fittings are used, the chambers into which the passages open are thereby caused to be of additional depth.

By making the cover fittings 27, 27 with interior partition webs 28, as shown in Figure 4, such webs being arranged to make contact with the end of the unit between adjacent courses of passages, then the fluid entering through the pipe 29, for instance, is compelled to make three passes through the unit, flowing first through the passages 11ª, being reversed in the chamber 30, flowing thence through the passages 11ᵇ, being again reversed in the chamber 31, and then flowing through the passages 11ᶜ to the outlet pipe 32. The passages 12 in this case provide for a single pass of the fluid flowing through them, between the chambers 20, 20.

Figures 5 and 6 illustrate the manner in which a number of similar units may be connected in series as to one of their sets of passages and in parallel as to another set. Three such units 10ª, 10ᵇ and 10ᶜ are here shown as so connected in series by means of cover fittings 16ª, intermediate plates 33, and tie-rods 34, with nuts 35. The cover fittings and plates may extend beyond the sides of the units to receive the tie-rods. Centrally these plates have openings of an area and dimensions large enough to form, when assembled as shown, chambers into which all of the passages of the units open. Thus free passage for one fluid is afforded throughout the entire series of units thus assembled. The transverse passages are connected by means of the fittings 17 and suitable piping to permit flow of fluid, or of a number of different fluids in parallel paths for heat interchanged with one fluid flowing through the alined series of passages.

The arrangement last described is typical and illustrative of a great many possible different arrangements, wherein two or more units may be combined for a special purpose. My purpose in showing this arrangement is not so much to disclose a specific combination, as it is to illustrate the principle that numbers of individual units may be combined in any arrangement desired for accomplishing a particular result, according to the desire of the designer. For instance, units which are short or shallow in one dimension and wide in the other dimensions, with passages running through the short dimension and one of the wide dimensions, may be superposed or otherwise placed in series in the manner of a sectional water heater, with spaces between them, and suitable flow connections between their longer passages, for the purpose of heating water or making steam, by products of combustion from a fire. Such possible arrangement is typified by the arrangement shown in Figure 5, wherein the passages 11 represent those through which the products of combustion flow, the passages 12 represent those through which water flows, and pipes 36 and 37 typify connections by which the water passages of the different units may be put into series connection with each other. The same piping also typifies means for making independent fluid connections with the various heaters. Either result indicated is made possible by proper manipulation of valves 38 and 39 shown in the piping.

Figure 7:
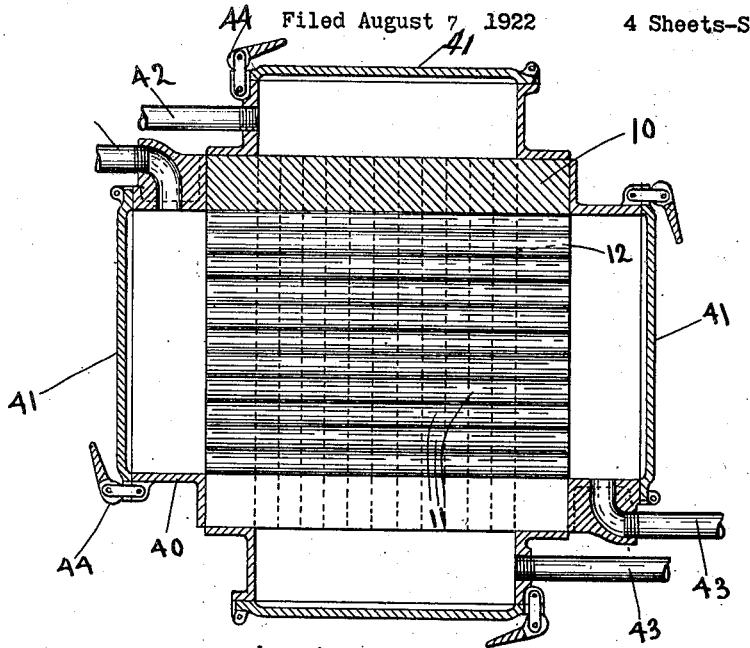
Figure 7 is a sectional view similar to other sections above described and illustrating a special type of connection fitting applied to the unit and adapted to permit ready cleaning of the fluid passages therein.

Referring to Figure 7 a special fitting is shown which affords opportunity for cleaning the passageways of the heat interchanger without disconnecting the piping. Here the frame fittings 40 and covers 41, hinged or otherwise removably connected thereto, correspond with the chamber fittings 16, 17, et cetera, already described, while the pipes 42, 42 and 43, 43 for conducting fluids to and away from the interior are applied to the sides of the frame fittings. By opening any of the covers 41, the passageways are exposed and access is given for any devices which may be used for cleaning. The parts 44 represent clamps or latches of any suitable sort, of which many kinds are available on the market and known to those skilled in this art, for closing the covers and permitting them to be readily opened.

Figure 8:
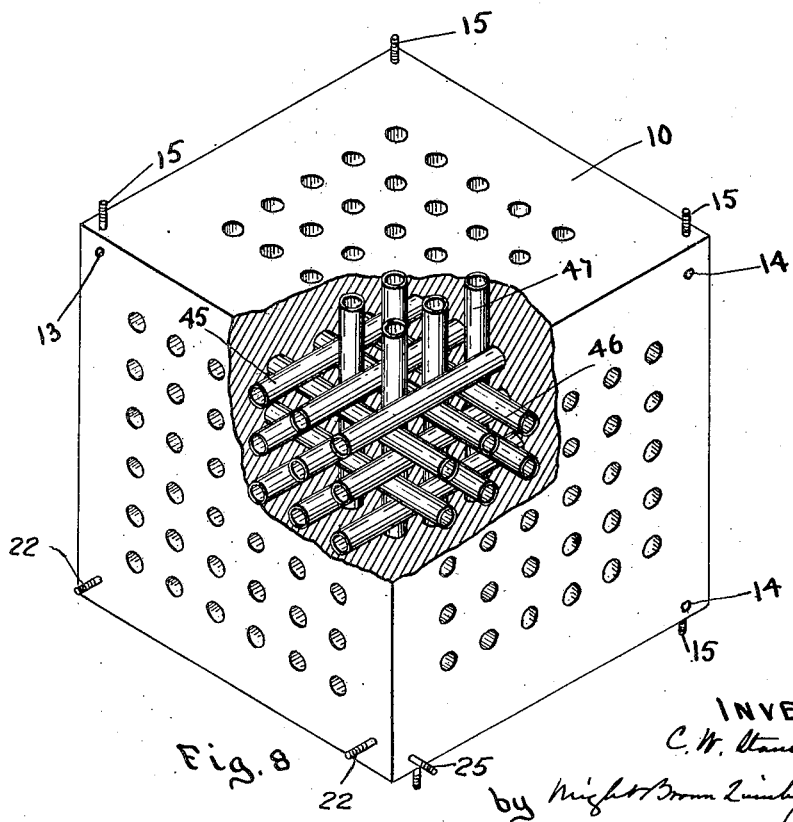
Figure 8 is a perspective view of another form of heat transfer unit, having interior tubes which extend in three directions, a part of the block being broken away to show the arrangement of the tubes.

Figure 8 shows a further carrying forward of the invention embodied in a condenser unit as already described, to the extent that three series of passageways are provided, in which each series is transverse to the other two. In a rectangular form of unit these passages are conveniently provided by alternating the respectively transverse tubes 45 and 46 with vertical tubes 47 and with each other. Thus not only the courses of each group or series of tubes, but also the individual tubes of each course, are separated and alternated with tubes of another set or series. This arrangement brings about the result that one fluid may be directed through one set of tubes and another fluid through either or both of the other two sets. This is of advantage where the second fluid is viscous and so cannot be driven at a high enough velocity through a number of tubes which would be adequate for a less viscous fluid. It also has the advantage that one of the two sets of tubes through which the same fluid is directed may be opened and cleaned while the heat interchanging action takes place without interruption between the different fluids in the other two sets of tubes.

Again, three different fluids may be caused to flow through the three different sets of tubes respectively. Thus through one set of tubes a fluid to be heated may be passed, through a second set a heating fluid may be passed, while through the third set may be circulated a third fluid of which the function is to absorb excess heat from the heating fluid when the temperature of the latter is much in excess of that to which the fluid being heated may be subjected, and to give out heat to the fluid being heated if the temperature of the heating fluid should drop below the required degree.

Of course it is to be understood that in this discussion of operation the term "tubes" is intended to be construed as including equivalent passages formed in the unit otherwise than by the embedding of distinct tubes.

This form of unit may also be manufactured according to the methods already indicated for the type in which the tubes are all in parallel planes; and it may be combined with fittings and piping substantially as already described for the conveyance of fluids to and from each of its various sets of passages.

Heat interchangers made according to the principles of this invention have many conspicuous advantages in comparison with the types commonly used, which consist of tubes attached by their ends to tube sheets or equivalent walls of a condenser or the like and are separated by intermediate spaces. First, the embedded arrangement enables adjacent tubes or passages to be placed much closer together than in the previous arrangement, which gives a much greater area of heat transferring surface in a heat interchanging unit of equal overall dimensions and area. Second, the efficiency of heat transfer is greatly increased due to the subdivision of the fluid into fine streams and the filling of all spaces between these streams by solid matter of high conductive capacity. Third, a much more rapid transfer of heat with a slower velocity of flow of the heating or cooling fluid through the interior is thus obtained than is possible with the means heretofore used. Fourth, such relatively slow velocity makes it possible to effect economy in propelling the fluid and in power for operating the propelling equipment. Fifth, the tubes or equivalent passages cannot work loose and leak, and thus is eliminated one of the most serious defects of heat interchangers of the previously known tubular type. Sixth, the cost of manufacture is relatively low.

I have been able with a unit constructed as before described, and comprising only three and one half cubic feet within overall dimensions, to accomplish results in the heating of water equal to those achieved with a feed water heater of the old type, having coiled tubes, and including 28 cubic feet within its overall dimensions. On account of its compactness therefore, this interchanger is particularly useful on shipboard.

All complication due to the use of glands for making tubes tight, all danger of tubes bursting under severe pressure, and all possibility of the tube creeping and becoming loose, are avoided with this interchanger.

The passages are easy to clean and this is a great advantage over prior heat interchangers, particularly those having coiled tubes, which cannot be cleaned at all. In my device the passages can be brushed out without breaking the connections with the piping.

On account of its greater compactness and because a heavy shell and multitudes of packing glands are not required, my heat interchanger may be made twenty five per cent or thereabout lighter in weight than those of the prior types having equivalent capacity.

The foregoing is not intended to be a catalogue of all the new or beneficial results which follow from my present invention, but is given simply as an indication of its utility.

What I claim and desire to secure by Letters Patent is:

1. A heat interchanger unit comprising tubes arranged in alternate courses in each of which the tubes are substantially parallel to one another, and in certain of which the tubes are transverse to those in other courses, such tubes extending at both ends beyond the outermost transversely arranged tubes in the other courses, and a mass of fusible solid material embedding said tubes and extending to the outer ends thereof forming solid masses at the edges of the unit.

2. A heat interchanger unit comprising a series of parallel tubes arranged in successive courses, a second series of tubes parallel to one another but transverse to the first series of tubes arranged in courses alternating with those of the said first series, and a mass of solid heat conducting material filling the interstices between the adjacent tubes and forming a substantially solid body outside of the outermost tubes of all the courses.

3. A heat interchanger unit comprising tubes arranged in alternate courses in each of which the tubes are substantially parallel to one another, and in certain of which the tubes are transverse to those in other courses, such tubes extending at both ends beyond the outermost transversely arranged tubes in the other course, and a mass of solid material embedding said tubes and extending to the outer ends thereof forming solid masses at the edges of the unit, the unit having in its external solid portions fastening means which project from the faces in which said tubes open.

4. The combination with a heat interchanger unit comprising essentially a solid block of heat conducting material with a series of passages running through it in one direction and a series of passages running through it in a different direction and interarranged with respect to those of the first set, said unit having solid unperforated masses at and adjacent to the borders of the faces through which said passages open, cover fittings applied over said faces and having provision for conduction of fluid to or away from said passages, and attaching means extending from said fittings into the said solid masses of the unit for detachably securing said fittings and units together.

5. A compound heat interchanger comprising in combination a series of units each consisting of a solid block of heat conducting material having rows of through passages arranged in successive course, the passages in each course being parallel to one another but transverse to those in adjacent courses, said units being arranged with their respective passages which extend in one direction in alinement with one another, intermediate members between adjacent units forming chambers into which the last-named passages open, means securing said units and members together, and external fittings attached to the respective faces of the several units through which the other series of passages open, said fittings having means for conduction of fluid to and from them.

6. A heat interchanger comprising a solid body having passageways running through it in different directions, those running in one direction being interspersed between those running in a different direction, fittings secured to the faces of said body and having open interiors into which said passages open, displaceable covers normally closing the ends of said fittings, and pipes for the conduction of fluid to and from said passages opening into the sides of said fittings; the displacement of said covers giving access to the tubes without disconnecting the pipes.

7. A heat interchanger comprising tubes running in different directions and arranged with those which extend in one direction in a course alternating with courses of the tubes which run in the other direction, combined with a mass of fusible metal embedding and surrounding said tubes and forming solid masses at the corners and ends of the unit, fittings secured to the solid parts of such unit to surround the areas into which said pipes open, which fittings are open internally from end to end, covers displaceably secured to the outer ends of said fittings, and conducting pipes attached to the sides of said fittings and being substantially wholly outside of the projections of the tubes.

8. A heat interchanger unit comprising a solid block having passages extending in each of three different directions, for fluids of respectively different temperatures, those passages which run in any one direction being substantially parallel to one another and arranged in alternation with those running in each of the other two directions.

9. A heat interchanger unit comprising a succession of courses or rows of tubes parallel to one another, a second succession of courses of tubes transverse to the first-named tubes and arranged alternately between the first-named courses the tubes of all of said courses being spaced apart from one another, and tubes extending through the spaces so provided, perpendicular to the tubes of both sets of courses, and a solid mass of heat-conducting material embedding said tubes and filling the spaces between them.

10. A heat interchanger unit comprising a set of tubes arranged parallel to one another in courses, a second set of tubes transverse to the first-named tubes and arranged in courses alternately between the first-named courses, the tubes of all of said courses being spaced apart from one another, a third set of tubes extending through the spaces so provided perpendicular to the tubes of both the before-named sets, the tubes of each of said three sets extending at both ends beyond the outermost tubes of each of the other sets, and a solid mass of heat-conducting material embedding said tubes and filling the corner spaces between the projecting ends of the several sets.

In testimony whereof I have affixed my signature.

CECIL W. STANCLIFFE.